Patented Oct. 17, 1944

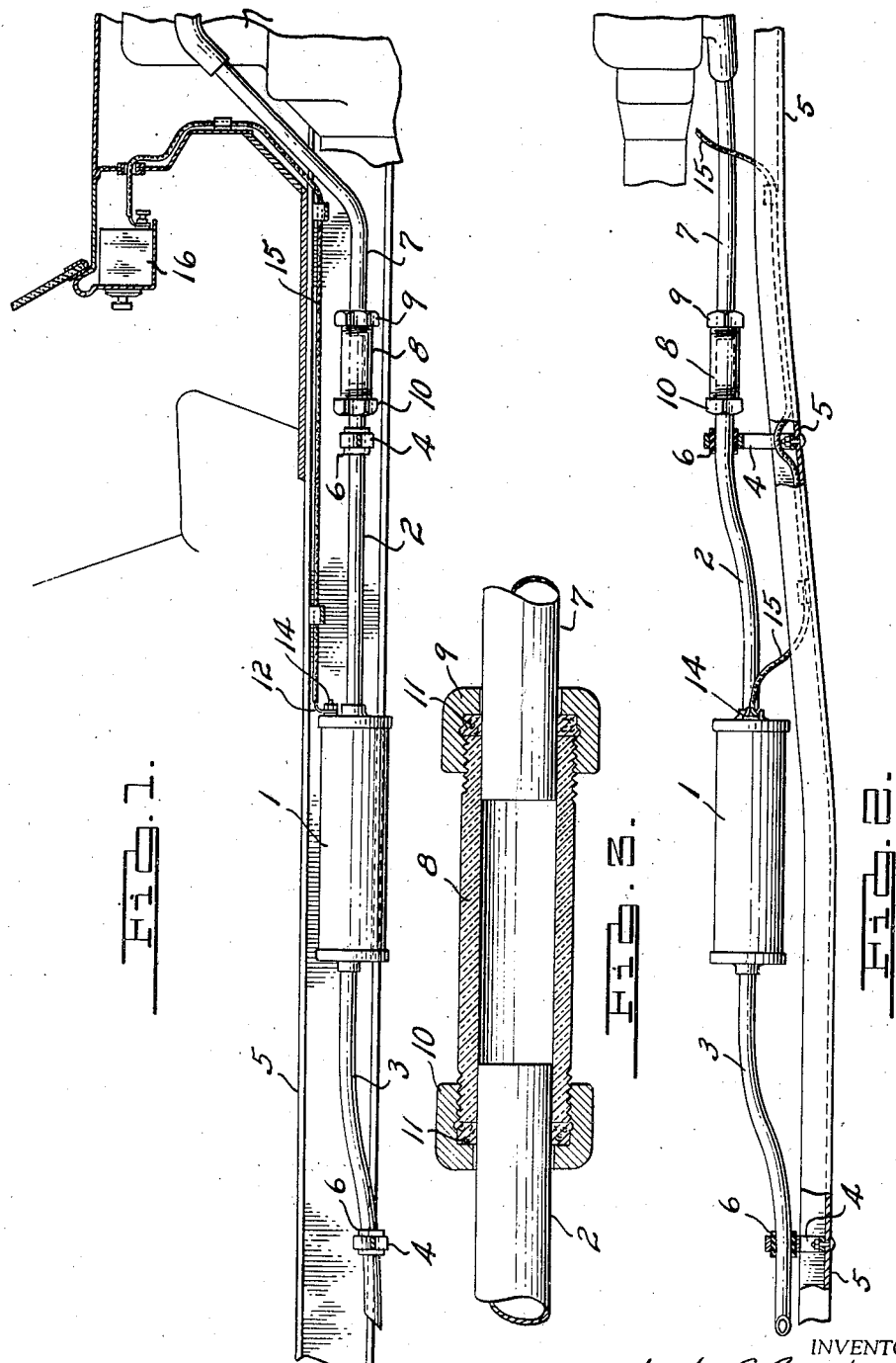

2,360,638

UNITED STATES PATENT OFFICE 2,360,638

AUTOMOBILE RADIO AERIAL

Lyle C. Armstrong, Pontiac, Mich.

Substituted for abandoned application Serial No. 100,163, September 10, 1936. This application February 19, 1944, Serial No. 523,127

2 Claims. (Cl. 250—33)

This invention relates to automobile radio antennae and is a substitute for my application Serial No. 100,163, filed Sept. 10, 1936, entitled Automobile radio aerial. The object of the invention is to provide a construction utilizing a part of the regular automobile equipment as the radio aerial antenna and insulating this equipment from the remainder of the automobile so that it will provide sufficient capacity to operate the automobile radio and at the same time prevent material capacity coupling between the parts used for the aerial and the other parts of the automobile.

Another object of the invention is to provide an automobile radio antenna consisting of the usual muffler and exhaust pipe which is supported in insulating brackets and is also insulated from the automobile exhaust manifold.

A further object of the invention is to provide a connection in the exhaust pipe between the automobile engine and the muffler whereby the muffler is insulated from the engine and, at the same time, may function in the usual manner while providing an antenna for the automobile radio.

A further object of the invention is to provide a tube of insulating material forming a part of the exhaust pipe and of sufficient length to prevent material capacity coupling between the muffler and the engine.

Another object of the invention is to provide a combination of an insulating tube between the muffler and the engine and a series of supporting brackets for the muffler arranged to insulate and support the muffler in spaced relation with the other parts of the automobile to prevent material capacity coupling.

These objects and the several novel features of the invention are hereinafter more fully described and claimed and the preferred form of construction by which these objects are attained is shown in the accompanying drawing in which—

Fig. 1 is a section showing the muffler as mounted in an automobile chassis and connected to the automobile radio.

Fig. 2 is a plan view showing the position of the muffler and pipes in relation to the automobile chassis.

Fig. 3 is an enlarged section through the insulator leading to the muffler.

The muffler 1 shown in Figs. 1 and 2 is provided with an inlet pipe 2 and with a discharge or tail pipe 3 and these pipes are supported in metal brackets 4 attached to the automobile chassis 5 as shown more particularly in Fig. 2. In order to insulate the pipes 2 and 3 from the automobile chassis an asbestos or other heat resisting and non-conductive insulator 6 is positioned about the respective pipe and is clamped within each bracket 4. The use of asbestos packing at this point also prevents the pipes 2 and 3 from rattling in the brackets 4. The exhaust pipe 7 from the automobile engine is normally connected directly to the muffler by means of an ordinary pipe coupling but, in this construction, the ends of the pipes 2 and 7 are separated as shown in Fig. 3 and extend into the opposite ends of an insulating tube 8 which may be threaded on the exterior to receive the packing nuts 9 and 10. A packing 11 is provided between each end of the insulating tube 8 and the nuts 9 or 10 so that in turning up the nuts 9 and 10 these packing are compressed to prevent gas leakage about the pipes 2 or 7.

When so connected, the insulating tube 8 insulates the pipe 2 from the pipe 7 and, at the same time, the tube 8 is preferably heat resistant so that it will not deteriorate when so used.

When assembled, as shown in Figs. 1 and 2, the radio lead in wire 12 may be connected to a binding post 14 secured to the muffler housing and this wire 12 is preferably carried through a tubular shield 15 to the automobile radio 16 shown in Fig. 1. By this arrangement, the muffler together with the pipes 2 and 3 and the nut 10 are completely insulated from the other parts of the automobile and provide an antenna for the automobile radio which is up out of the way underneath the car where it will not easily be disturbed or damaged and as the muffler and pipes 2 and 3 become very hot foreign matter is prevented from adhering to these parts. The fact that the muffler and pipes 2 and 3 become very hot prevents ice from forming on these parts and possibly grounding the aerial to the other parts of the car and the heat of these parts also keeps the parts dry so that there is no opportunity of grounding the aerial during a rain storm or by foreign matter accumulating between the parts of the aerial and the other parts of the automobile. By use of the insulating tube 8 and by spacing the muffler and pipes 2 and 3 at a considerable distance from other metal parts of the automobile by means of the brackets 4, material capacity coupling between the parts of the antenna and the other parts of the automobile is prevented and thus maximum efficiency is obtained from the antenna. Also, by means of the special shielded lead in wire, material capacity coupling is prevented between the lead in wire and the automobile frame and other parts.

While I have described the insulators 6 as being made of asbestos, these may be made of any other suitable insulating material and the tube 8 may be made of any heat resisting insulating material which will stand up under the heat and pressures normally carried through the exhaust pipe. The length of the tube or apertured element 8 need only be sufficient to prevent a material capacity coupling between the parts forming the antenna and the engine or exhaust conduit 7.

From the foregoing description it becomes evident that the device is very simple and efficient in operation, will not easily get out of order, may be installed at very low cost and provides a device which accomplishes the objects described.

Having thus fully described my invention, its utility and mode of operation, what I claim and desire to secure by Letters Patent of the United States is:

1. An antenna for the radio apparatus of an automobile having an internal combustion engine, comprising a portion of the exhaust gas conduit for the engine, an apertured insulating element between said exhaust gas conduit portion and the engine, said insulating element being incombustible by the heat of the exhaust gases passing through the said portion of the exhaust conduit, means insulating said conduit portion from the remaining portion of the automobile, and a lead-in wire directly connected to the said insulated portion of the exhaust conduit and to the radio apparatus.

2. An antenna for the radio apparatus of an automobile having an internal combustion engine, comprising a muffler and portion of the exhaust conduit for the engine, an apertured insulating element between the muffler and engine and subject to the heat of exhaust gases and incombustible by the heat thereof whereby it is maintained practically free from carbon deposit, a shielded lead-in wire connected directly to the muffler and leading to the radio apparatus, and means supporting said muffler and conduit portion in insulated relation with the remaining portions of the automobile.

LYLE C. ARMSTRONG.